United States Patent Office 2,715,624
Patented Aug. 16, 1955

2,715,624

DIMETHYL PIPERAZINIUM THEOPHYLLINE-7-ACETATE

Joseph Lester Szabo, Drexel Hill, and William F. Bruce, Havertown, Pa., assignors, by mesne assignments, to American Home Products Corporation, New York, N. Y., a corporation of Delaware No Drawing. Application June 4, 1952, Serial No. 291,808

9 Claims. (Cl. 260—253)

This invention relates to certain new chemical compounds, and the method by which they may be prepared from readily available starting materials. More particularly, it relates to certain novel dimethylpiperazine salts of theophylline-7-acetic acid, and to their preparation by reacting dimethyl piperazine and theophylline-7-acetic acid.

The new chemical compounds, the 2,5-dimethyl, and 2,6-dimethylpiperazinium theophylline-7-acetates, are valuable in medicine as bronchodilators, being especially useful in the treatment of cardiac disorders and bronchial asthma. They may be administered intravenously (dissolved in an isotonic solution). In some cases they may be incorporated in rectal suppositories or given by aerosol procedures. They are capable of use both in human therapy and in veterinary applications. They are also useful for other purposes, such as for preparing less soluble salts of theophylline-7-acetic acid and as reagents for general chemical use.

Our new chemical compounds are chemically somewhat allied to "Aminophylline" (theophylline ethylene diamine), and clinical evidence indicates that they exhibit bronchodilator activity which is at least equal to that of theophylline ethylene diamine. Laboratory tests, in fact, show considerably greater bronchodilatory activity for our new compounds than for "Aminophylline." On the other hand, the toxicity of the 2,5-dimethyl, and 2,6-dimethylpiperazinium theophylline-7-acetates is of such a low order that doses of 4 grams per kilogram weight of test animals has been shown not to be toxic. This toxicity is therefore considerably lower than that of theophylline ethylene diamine, the administration of which, moreover, results in the deposition of toxic theophylline in the kidneys of the patients to whom it is administered. Theophylline cannot be deposited from our new compounds upon their administration because no theophylline is present therein, since it has been converted to theophylline acetic acid.

Our new chemical compounds are dimethylpiperazinium theophylline-7-acetic acid, more particularly 2,5-dimethylpiperazinium di-theophylline-7-acetate and 2,6-dimethylpiperazinium di-theophylline-7-acetate. They are white crystalline solids, highly soluble in water or in the isotonic solutions in which they would normally be dissolved for their intravenous injection in animals and human beings. They may readily be prepared by reacting substantially one mole of the dimethylpiperazine with substantially two moles of theophylline-7-acetic acid.

Theophylline-7-acetic acid, one of the starting materials used in the preparation of our new chemical compounds, is readily prepared from theophylline and chloroacetic acid by reacting the sodium salt of theophylline and the sodium salt of chloroacetic acid to give theophylline-acetic acid sodium salt. We have found it desirable, after acidification, to dissolve the entire crude product, consisting of both unreacted theophylline and the acid product, in an aqueous solution of an alkali, such as a solution of 10% sodium hydroxide in water. By bubbling carbon dioxide cautiously through the solution, or by cautiously adding acetic acid to adjust to a pH of substantially 8.0, the unreacted theophylline is precipitated substantially completely, and very little of the theophylline-7-acetic acid is precipitated. After filtering off the theophylline and adding a mineral acid, such as hydrochloric or sulfuric acid, to the filtrate until it is just acid when tested with Congo red indicator, the desired starting material for use in our process, theophylline-7-acetic acid, is precipitated in very pure form.

In preparing our new chemical compounds, substantially two moles of theophylline-7-acetic acid and one mole of the dimethylpiperazine are reacted in an aqueous reaction medium. The presence of a slight excess of the dimethylpiperazine is desirable. It is preferable to dissolve two equivalents of theophylline acetic acid and one equivalent of dimethylpiperazine in hot water, warming until solution is complete, and concentrating the solution on a steam bath, after decolorization with adsorbent carbon, if desired. When a solid material beigns to appear in the solution, it is cooled, whereupon the product, dimethyl piperazinium dithcophyllin-7-acetate, crystallizes out in the form of white crystals. Additional yield of product can be secured by further concentrating the mother liquors, or by precipitating product by the addition of acetone or alcohol.

The new compounds are highly soluble in water. After filtration, washing with alcohol, and drying, the two new compounds obtained, depending on the particular dimethylpiperazine used, are as follows:

2,5-dimethylpiperazinium di-theophylline-7-acetate, melting point 227–8° C.
2,6-dimethylpiperazinium di-theophylline-7-acetate, melting point 241° C.

The 2,5-dimethylpiperazinium theophylline-7-acetate may be represented by the following formula:

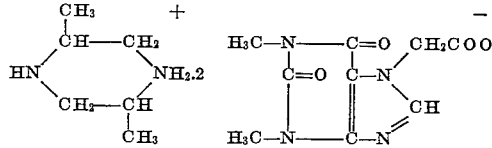

The 2,6-dimethylpiperazinium theophylline-7-acetate has the following formula:

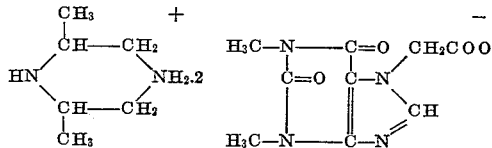

The novel salts forming the subject matter of our invention, as shown by the formulae, comprise two equivalents of acid to one equivalent of base. Our invention also comprises salts, formed in solution to some extent, in which there is but one equivalent of acid to one of base.

As an example of our process for the preparation of the new chemical compounds possessing valuable pharmacological activity, the following procedure may be given:

Example 3.0 grams of 2,5-dimethylpiperazine was dissolved in a small volume (10 to 20 milliliters) of water, and 12.42 grams of theophylline-7-acetic acid was added thereto. The mixture was warmed to complete solution, and then filtered through a charcoal filter in order to decolorize the solution.

The clear solution was then partially evaporated, and allowed to stand until a white product crystallized out, This was filtered off, washed with ethanol, and then dried. The white crystalline solid product was 2,5-dimethylpiperazinium di - theophylline - 7 - acetate, melting point 227–8° C.

By the same procedure, starting with 2,6-dimethylpiperazine, there was recovered 2,6-dimethyl-piperazinium di-theophylline-7-acetate, melting point 241° C.

Since various changes and modifications may be made in our improved procedure as herein disclosed without departing from the spirit of our invention, it is intended that these variations, to the extent that they are within the scope of the appended claims shall be regarded as part of our invention.

We claim:

1. Dimethylpiperazinium thophylline-7-acetate.
2. A dimethylpiperazinium di-theophylline-7-acetate selected from the group which consists of 2,5-dimethylpiperazinium di-theophylline-7-acetate and 2,6-dimethylpiperazinum di-theophylline-7-acetate.
3. 2,5-dimethylpiperazinium di-theophylline-7-acetate.
4. 2,6-dimethylpiperazinium di-theophylline - 7 - acetate.
5. The method which comprises reacting theophylline-7-acetic acid and dimethylpiperazine in an aqueous reaction medium.
6. The method which comprises reacting theophylline-7-acetic acid and 2,5-dimethylpiperazine in an aqueous reaction medium.
7. The method which comprises reacting theophylline-7-acetic acid and 2,6-dimethylpiperazine in an aqueous reaction medium.
8. The method of claim 6, wherein the product is recovered from the reaction medium by crystallization.
9. The method of claim 7, wherein the product is recovered from the reaction medium by crystallization.

References Cited in the file of this patent

Phillepot et al., Arch Intern. Pharmacodynamie, 82, 239–42 (1950).

Baisse, Bull. Soc. Chim. France, 1949, 769.